United States Patent [19]

Gelbwachs

[11] Patent Number: 5,667,304
[45] Date of Patent: Sep. 16, 1997

[54] MESOSPHERIC TEMPERATURE SENSING LIDAR APPARATUS

[75] Inventor: Jerry A. Gelbwachs, Hermosa Beach, Calif.

[73] Assignee: The Aerospace Corporation, El Segundo, Calif.

[21] Appl. No.: 356,931

[22] Filed: Dec. 15, 1994

[51] Int. Cl.⁶ .................................................. G01K 11/32
[52] U.S. Cl. ........................................ 374/137; 374/161
[58] Field of Search ................................ 374/136, 137, 374/161; 250/338.5, 461.1

[56] References Cited

U.S. PATENT DOCUMENTS

| | | | |
|---|---|---|---|
| 3,632,212 | 1/1972 | Bernal | 374/161 |
| 4,425,503 | 1/1984 | Watkins et al. | 250/338.5 |
| 4,493,553 | 1/1985 | Korb et al. | 374/137 |
| 4,986,654 | 1/1991 | Meijer et al. | 374/161 |
| 5,055,692 | 10/1991 | Abbiss et al. | 250/372 |
| 5,111,055 | 5/1992 | Fima | 250/461.1 |
| 5,161,890 | 11/1992 | Fima | 374/123 |
| 5,196,716 | 3/1993 | Moriya et al. | 250/572 |
| 5,459,324 | 10/1995 | Fima | 250/338.5 |

OTHER PUBLICATIONS

J. T. Houghton, The Physics of Atomspheres, Cambridge University Press, Cambridge, 1986, pp. 57–58, 70, 110.

A. Hauchercorne, M. L. Chanin, P. Keckhut, P. Nedeljkovic, LIDAR Monitoring of the Temperature in the Middle and Lower Atmosphere, Applied Physics, B 55, pp. 29–34 (1992).

C. S. Gardner, Sodium Resonance Fluorescence Lidar Applications In Atmospheric Science and Astronomy Proc. IEEE vol. 77, pp. 408–418, (Mar. 1989).

C. Granier, J. P. Jegou, G. Megie, Iron Atoms and Metallic Species In the Earth's Upper Atmosphere Geophysical Research Letter, vol. 16, No. 3, pp. 244–246 (Mar. 1989).

M. Alpers, J. Hoffner, U. Von Zahn, Iron Atoms Densities in the Polar Mesophere from Lidar Observations Geophysical Research Letters, vol. 17, No. 12, pp. 2345–2348, (Dec. 1990).

T. J. Kane, P. H. Mui, C. S. Gardner, Evidence for Substantial Seasonal Variations in the Structure of the Mesospheric Fe Layer Geophysical Research Letters, vol. 19, No. 4, pp. 405–408 (Feb. 1992).

W. L. Wiese, G. A. Martin, Wavelengths and Transistion Probabilities For Atoms and Atomic Ions, p. 380, (Nat. Standard Ref. Data System—NBS 68, Washington, DC Dec. 1980).

M. L. Chanin, A. Hauchercorne, Lidar Observation of Gravity and Tidal Waves in the Stratosphere and Mesosphere Journal of Geophysical Research, vol. 86, No. C10, pp. 9715–9721 (Oct. 1981).

P. Keckhut, A. Hauchercorne, M. L. Chanin, "A Critical Review of the Data Base Acquired For Long Term Surveillance of the Middle Atmosphere by the French Rayleigh Lidars", Journal of Atmospheric and Oceanic Technology, vol. 10, pp. 850–867 (1993).

(List continued on next page.)

Primary Examiner—William A. Cuchlinski, Jr.
Assistant Examiner—John L. Beres
Attorney, Agent, or Firm—Derrick M. Reid

[57] ABSTRACT

A lidar sensing apparatus having a laser generating alternating pulses at two respective wavelengths, 372 nm and 374 nm, an optical beam transmitter, a receiver telescope for collecting backscattered returns, a band pass optical filter for isolating the returns at 372 nm and 374 nm wavelengths, a photodetector for converting the returns into electronic counts and a data processor for relating the electronic counts into temperature, is used for mesospheric temperature sensing of the iron layer in the 80 to 100 Km altitude regions by collecting fluorescence returns which are related to temperature using a Fe Boltzmann technique. The apparatus also captures backscattered returns from the middle atmosphere between 30 and 80 km for temperature sensing using the Rayleigh technique, providing a complete temperature profile from 30 to 100 km altitudes.

20 Claims, 4 Drawing Sheets

Fe Boltzmann Lidar System

U.S. PATENT DOCUMENTS

U. S. Standard Atmosphere, Oct. 1976, pp. 62–68, NOAA, Washington D.C., 1976, vol. 25, pp. 940–941, Dec. 1981).

K. H. Fricke, U. Von Zahn, "Mesopause Temperatures Derived From Probing the Hyperfine Structure of the $D_2$ Resonance Line of Sodium by Lidar", Journal of Atmospheric and Terrestrial Physics, vol. 47, No. 5, pp. 499–512 (1985).

C. Y. She, J. R. Yu, H. Latifi, R. E. Bills, "High–Spectral–Resolution Fluorescence Light Detection and Ranging for Mesospheric Sodium Temperature Measurements", Applied Optics, vol. 31, No. 12, pp. 2095–2106 (Apr. 1992).

Fe Boltzmann Lidar System

Atomic Iron Energy Levels

Sensitivity Temperature Plots

MESOSPHERIC TEMPERATURE SENSING LIDAR APPARATUS

STATEMENT OF GOVERNMENT INTEREST

The invention was made with Government support under Contract No. FO4701-93-C-0094 by the Department of the Air Force. The Government has certain rights in the invention.

The invention described herein may be manufactured and used by and for the government of the United States for governmental purpose without payment of royalty therefor.

1. Field of the Invention

The present invention relates to the field of middle atmosphere temperature monitoring and remote sensing using Laser beams. More particularly, the present invention relates to Ladar and Lidar systems, and more specifically to Lidar apparatus and techniques for mesospheric temperature sensing of soft bodies including gases and clouds within the mesosphere.

2. Background of the Invention

Knowledge of the temperature and gas density in the middle atmosphere is important for the understanding of a wide range of geophysical phenomenon such as air flow, mesospheric temperature inversion, gravity wave breaking and reentry effects, and for discerning trends in global climate changes. The standard meteorological techniques currently employed for mesospheric temperature measurements include datasonde rockets for measurements between 20 and 65 km and the passive sphere for altitudes between 30 and 90 km. Nadir viewing satellites with on board radiometric sensors have contributed to the acquisition of temperature profiles. However, these methods currently lack the accuracy and spatial resolution required for many applications.

Lidar systems have been used for remote sensing of the middle atmosphere. A lidar system uses a laser beam for optical sensing of the atmosphere by laser beam illumination of gas molecules which then backscatter the illumination light to provide a distributive return which can be sensed. The lidar system transmits an illumination beam into the atmosphere and then senses backscattered returns from which to infer temperature, gas density, altitude, or other atmospheric characteristics. Improved accuracy and spatial resolution of the lidar system makes it an ideal ground based instrument for middle atmospheric monitoring and for calibrating sensors on board satellites. There are a number of well known backscattering spectroscopy phenomena including atomic absorption and emission, reflection, refraction and elastic backscattering, among many others. It is desirable to use the optical interaction which provides the greatest return signal to improve signal to noise ratios. However, there are twenty orders of magnitudes in the various types of lidar returns using differing optical interaction phenomena.

A conventional ground based lidar system would have a laser transmitting an illumination pulse beam directly upwards into the atmosphere, and would have a receiving aperture for collecting backscattered photon returns. Optical filters having a suitable band pass isolate return signals of interest from background radiation. Photodetectors absorb photon returns within the bandpass and convert the absorbed photon returns into electronic signal counts. The electronic counts are counted over a period of range time corresponding to altitude. The entire range time is divided into a plurality of time segments each of which represents an altitude range segment with a respective count representing the amount of photon returns collected within that altitude range segment. The photon electronic count is based upon the number of photons absorbed per area of a photodetector. The photoelectronic counts are counted by time segment, that is by altitude range, to produce a photocount by altitude profile. Data processors can relate by time segments, the photocounts to temperature to produce a temperature profile related to altitude, by altitude range segments, for the entire altitude range time period, that is over an entire altitude range. The data processors can use a variety of algorithms which are matched to the specific lidar detection method for relating a temperature profile based upon the photoreturns within respective time segments.

Temperature measurement in the 30 to 90 km altitude region have been recorded by Rayleigh lidar systems sensing elastic backscattered returns from atmospheric nitrogen and oxygen. The returns are converted into temperature data by assuming hydrostatic equilibrium and using the ideal gas law. Model atmospheric densities and temperature from U.S. standard atmospheric data can be used in a Rayleigh simulation to verify measured results. The magnitude of the elastic backscattered return signals are a direct measure of gas density which can be related to temperatures using aforementioned approximations. However, because of the rapid decline of atmospheric density with altitude, it is very difficult to obtain high precision temperature measurements with a Rayleigh lidar beyond 80 km. Moreover, the Rayleigh technique is based upon successive measurements, and poor end point calibration at high altitudes limits the Rayleigh lidar technique in the mesosphere. Further still, backscattering from stratospheric aerosols provides background interference limiting Rayleigh lidar usage at lower altitudes.

Rayleigh lidar data has been obtained with frequency-doubled Nd:YAG transmitters operating at 532 nm and XeF excimer laser operating at 351 nm having a Rayleigh lidar efficiency of 0.25 and providing an optical absorption cross section of $8.4 \times 10^{-27}/cm^2$, at 200° K. in a density of $7 \times 10^{13}/cm^3$ at 90 km. From the ideal gas law, the temperature sensitivity of the Rayleigh technique is relatively poor and is equal to one. Photocounts for a 1% temperature precision requires $1 \times 10^4$ counts which is disadvantageously large in the presence of relatively weak optical cross sections. A limitation of the Rayleigh lidar is the relative weak optical cross section with corresponding weak optical returns in the 80 to 100 km altitude providing relatively poor signal to noise ratios limiting the usefulness of the Rayleigh lidar at these higher middle altitudes. From the wavelength dependence of the Rayleigh backscattering return count, absorption cross-section, atmospheric transmission and photomultiplier tube quantum efficiency, it has been determined that the optimum spectral region for middle atmospheric Rayleigh lidar is 360 nm to 410 nm.

The sodium (Na) layer in the mesosphere has been sensed by lidar systems for monitoring temperature. The Na Doppler lidar relies upon well understood atomic absorption and emission spectroscopy. The optical fluorescence return sodium linewidth provide an indication of the distribution of atmospheric sodium molecular velocities which is related to temperature. Two Doppler techniques have yielded measurements in the 80 to 100 km altitude range. Both methods involve excitation of the strong $D_2$ resonance line near 589 nm and monitoring the subsequent fluorescence emission. In the first method, a Na lidar using an excimer-pumped dye-laser scanning over the Doppler profile bandwidth has obtained Na temperature profiles with a 1 km resolution and a 10° K. accuracy. In the second method, a stabilized dye-laser oscillator-amplifier system has measured Na temperatures between 82 and 102 km with a 1 km resolution and 3° K. accuracy. In the second method, the hyperfine-split Doppler line is probed by optical pulses at two precisely controlled wavelengths. The first pulse is tuned near the resonance return peak and the second pulse is tuned to the cross over resonance located 0.85 GHz from the first pulse. Hence, the Na lidar system disadvantageous requires stringent frequency stability. The ratio of the returns is temperature sensitive. At 200° K., the ratio is approximately 0.3 and the temperature sensitivity is 1.53. In the 150° K. to 250° K. range, the temperature sensitivity varies from 1.90 to 1.36 with a Na density of $5 \times 10^3$ at 90 km. Using a wavelength of 589.159 nm, the fluorescence cross section is $9.5 \times 10^{-21}$ cm$^2$. Using a wavelength of 589.158 nm, the fluorescence cross section was $2.8 \times 10^{-12}$ cm$^2$ with $4.2 \times 10^3$ counts for 1% temperature precision. The Na D line Doppler lidar has provided temperature data in the 85 to 110 km range sensing lidar fluorescence returns. A limitation of the Na Doppler lidar is its application to only the metallic mesosphere Na layer lying approximately in the 80 and 110 km altitude range.

A combination of a Rayleigh backscattering lidar and a Na Doppler fluorescence lidar would seem to provide a useful complete temperature profile throughout the middle atmosphere between 30 and 100 km. However, this combination requires the use of two different systems which are inherently incompatible especially in terms of the transmitted frequency and optical filtering. An extension of the 589 nm wavelength of the Na lidar to lower altitudes for Rayleigh sensing yields exceedingly weak returns for the lower atmosphere sensing, such that coupling a Na lidar with the Rayleigh lidar using the same pulse energies and collection apertures to acquire a complete temperature profile using a single lidar apparatus would be technically impracticable. Thus, to obtain a complete atmospheric profile between 30 and 100 km, a separate mesospheric Na lidar system and a separate middle atmospheric Rayleigh lidar system can be used.

Lidar systems have recorded the presence of atomic iron (Fe) in the mesosphere. A Fe mesospheric metallic layer lidar system was tuned to a 372 nm fluorescence resonance line wavelength. Fe layer measurement employed a single dye laser generating 10 to 25 mJ transmission pulses. This amount of energy is suitable for mapping the Fe layer density profiles by excitation of the strong 372 resonance line. It has been determined that the Fe layer extends from 80 to 100 km. Fe lidar systems have recorded seasonable variations of the Fe densities with instances of sporadic enhancements. The permanent Fe layer has densities in excess of Na values in the metallic layer. It is known that peak Fe densities vary from $1 \times 10^4$/cm$^3$ in the summer to $3 \times 10^4$/cm$^3$ in the spring and fall with the Fe layer centered at 88.5 km with a mean rms layer width of 3.0 km. The spectroscopy of Fe is well known. While, the mesosphere contains atomic Fe, present lidar system disadvantageously do not use Fe mesospheric concentrations to determine temperature profiles of the mesosphere. Fe mesospheric lidars have not been applied to temperature sensing of the mesosphere. These and other disadvantages are solved or reduced using the present invention.

SUMMARY OF THE INVENTION

An object of this invention is to measure the temperature of the mesosphere.

Another object of this invention is to measure the temperature of the mesosphere using fluorescence emissions of two wavelengths upon which a Boltzmann technique determines the temperature.

Yet another object of the present invention is to measure the temperature of the mesosphere of 80 to 100 km using the spectroscopy of atomic Fe concentrations and simultaneously acquiring temperature measurements in the 30 to 80 km altitude by a Rayleigh backscattering method.

Still another object of the invention is to measure the temperature of the mesosphere of 80 to 100 km by a Boltzmann technique using the spectroscopy of atomic Fe concentrations and simultaneously acquiring temperature measurements in the 30 to 80 km altitude by a Rayleigh backscattering method, both measurements derive from a single laser transmitter and collector apparatus.

A new lidar system provides for middle atmospheric temperature measurement which senses the presence of the Fe metallic layer in the 80 to 100 km altitude range. Temperature measurement of the mesosphere between 80 to 100 km range relies upon the spectroscopy of atomic Fe in the mesospheric Fe layer. Illumination of the highly stable Fe layer provides strong fluorescence returns suitable for optical collection and detection, and temperature determination. A conventional lidar system is modified to transmit alternating pulses of 371.99 and 373.71 nm Fe resonance line wavelengths and is further modified to collect Fe fluorescence emission returns for generating photocounts which are then related to temperature using a Boltzmann technique. Absolute temperatures are inferred by a Maxwell-Boltzmann relationship from the ratio of respective lidar returns from mesospheric Fe atoms excited at 371.99 nm and 373.71 nm, respectively corresponding to a Fe ground state resonance spectral line and a thermally-populated Fe resonance line.

In another aspect of the inventions, these Fe spectroscopic wavelengths are also well suited for Rayleigh backscattering lidar temperature sensing of the middle atmosphere between 30 and 80 km. The present invention recognizes that the Fe resonance lines fall within a wavelength range of optimum Rayleigh lidar. Moreover, the Fe lidar returns from the mesosphere at 80 km provide upper calibration end points for Rayleigh temperature measurements from which the remaining temperature profile between 30 to 80 km altitude can be accurately acquired. Transmitted laser illumination pulses produce both 80 to 100 km Fe layer fluorescence returns and 30 to 80 km Rayleigh elastic backscattering returns both well suited for collection, optical filtering, and photodetection from which temperature determination can be computed. Hence, a single lidar apparatus is devised that can monitor simultaneously Rayleigh returns and Fe fluorescence returns excited by the same laser transmitter pulses and collected by the same telescope to provide a complete atmospheric temperature profile between 30 and 100 km.

The present invention flows from a discovery that the Rayleigh backscattering returns from the lower mesosphere are comparable in magnitude to the Fe returns, a result which is independent of system parameters, enabling a single lidar system to properly function simultaneously using the two different temperature measuring techniques in a signal system. The system has been analyzed to provide improved temperature sensitivity over the entire 30 to 100 km altitude range. The system provides absolute temperature measurements over the entire temperature profile. The system is designed to operate within an eye safe region of the spectrum compatible with solid state laser technology advantageously requiring only moderate frequency stability. These and other advantages will become more apparent from the following detailed description of the preferred embodiment.

DETAILED DESCRIPTION OF THE PREFERRED EMBODIMENT

Figure 1:
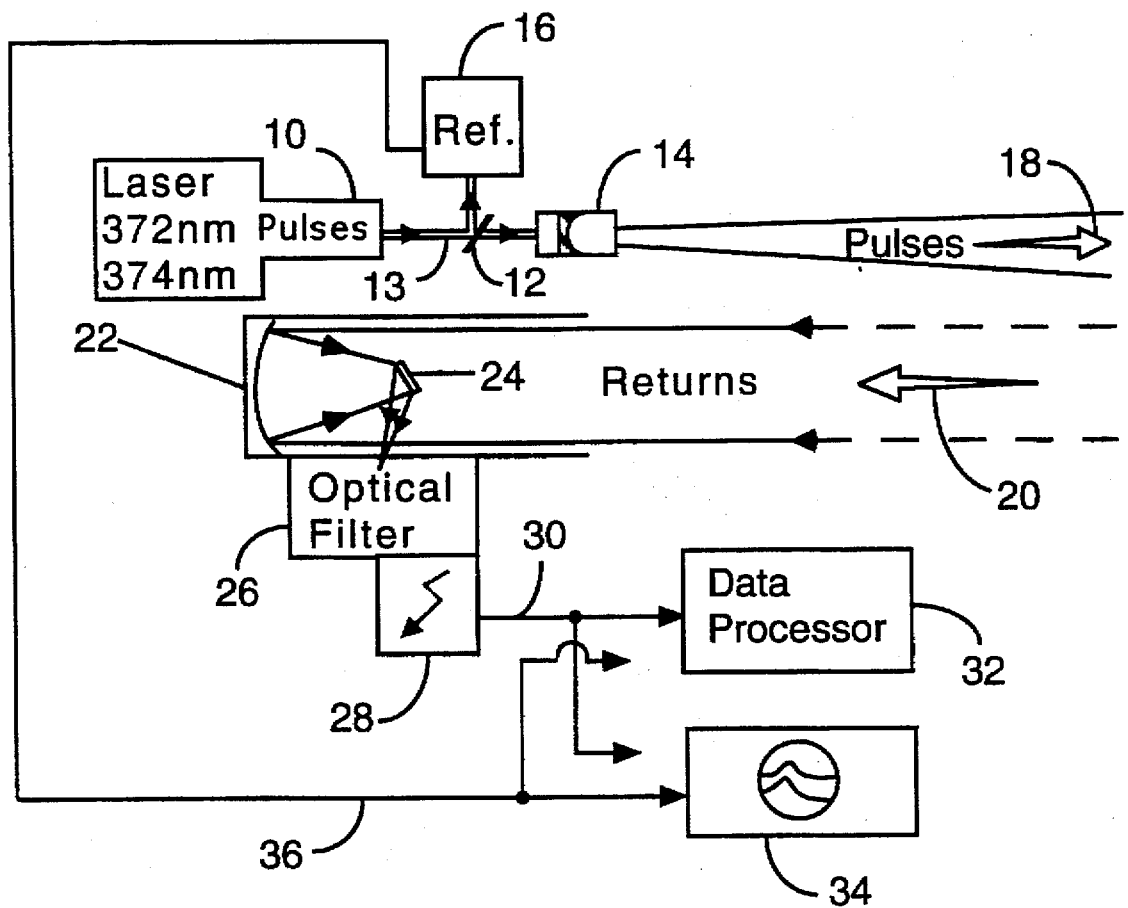
FIG. 1 is a block diagram of a lidar system in accordance with the present invention having a modified laser, optical filter, photodetector, signal acquisition and data processor to perfect Iron (Fe) Boltzmann and Rayleigh lidar temperature measurements.

An embodiment of the present invention is described with reference to the Figures. Referring to FIG. 1, a conventional lidar system is shown to be modified in accordance with the present inventions. The representative lidar system is employed to remotely sense atmospheric temperature by a new Fe Boltzmann technique preferably for the 80 to 100 km range and by the Rayleigh technique preferably for the 30 to 80 km altitude range.

A laser 10 is used to generate alternating 371.99 nm and 373.71 nm wavelength pulses which are optically split using a beam splitter 12 in the optical path 13 from the laser 10. The optical path 13 communicates the pulses to transmitter optics 14 and communicates a portion of the pulses to a laser monitor 16. The laser 10 may be a frequency-doubled alexandrite laser, though other lasers may be used as well. The transmitter optic 14 directs illumination pulses 18 directly upward into the atmosphere. The laser 10 preferably generates an alternating series of pulses of one wavelength and then the other. Each of the transmitted pulses 18 illuminate the atmosphere which provides backscattered returns 20 which are optical signals that are collected by a conventional telescope 22 preferably having a typical collection area of one square meter.

The backscattered returns 20 include a variety of optical signals based upon atmospheric gaseous concentrations and conditions and based upon a plurality of optical interactions. Focusing lens 24 directs the collected backscattered returns 20 collected by the telescope 22 onto an optical filter 26 which isolates the wavelength returns of interest from the variety of optical signals of the backscattered returns 20. The optical filter 26 is a narrow band pass filter to isolate backscattered optical signals of interests having 371.99 nm and 373.71 nm wavelengths. The optical filter is preferably a narrow band pass filter centered at 373 nm with at least a two nm band width. The band width could be increased to pass the weak 367.99 nm fluorescence returns.

A photodetector 28 is illuminated by filtered optical signals from the optical filter 26 to convert those optical signals into electronic signals in the nature of electronic pulse counts. The electronic counts are communicated on line 30 to a data processor 32 and display monitor 34. The photodetector 28 may be a photomultiplier tube where return photons of returns 20 are converted into the electronic pulse counts. The photomultiplier tube can be a conventional one inch diameter bi-alkali photocathode that possesses high quantum efficiency and low dark current noise at the 373 nm wavelength. The band pass filter isolates the 371.99 and 373.71 nm backscattered returns, as well as near by returns, for example, the returns at 367.99 nm. The electronic pulse counts communicated over signal line 30, are analyzed by the data processor 32 and displayed by the display monitor 34. The display of the monitor 34 may take the form of a photocounts display relating the photo electronic counts to respective time segments of an entire altitude range time period.

The laser monitors 16 provides a laser reference signal of the transmitted pulses 18 so that the data processor 32 and display monitor 34 can reference the backscattered returns 20 to the transmitted pulses 18. The measured output energy reference from the laser monitor 16 serves to normalize the photocounts of the backscattered returns 20. The time displacement from the transmission of the transmitted pulses 18, that is the laser pulses from the laser 10, and the returns 20 determine the altitude range for the returns, while the wavelength of the pulses 18, that is the wavelength of the laser pluses from the laser 10, reference the returns 20 to respective wavelength of the illumination pulses 18.

The returns 20 are collected and electronic pulses are counted for a predetermined range period of time, preferably for example, one millisecond, subsequent to respective transmission of each illumination pulse 18. The range period of time corresponds to the altitude range of interest over which temperature is to be sensed. The range period time is divided into range time segment periods. Respective electronic counts representing the amount of collected photons within the band pass of the optical filter 26 and detected by the photodetector 28 are accumulated for each range time segment. Each time segment may be characterized as a time segment bin into which is accumulated the number of collected return photons during that respective time segment bin. Preferably, the time segments are short in duration, for example, one microsecond in duration providing, for example, one thousand time segments over the preferred one millisecond range period. For each of the transmitted pulses 18, the data processor 32 compiles photocounts for each of a plurality, e.g. one thousand, of vertically referenced amplitudinal electronic count values, one for each time segment over the entire horizontally referenced range time period, e.g. one millisecond. For a series of transmitted pulses, for example, ten thousand pulses of the same wavelength, a series of accumulated photocounts are compiled by the data processor 32. The compiled counts are averaged by averaging electronic counts by respective time segments to produce average counts for the series of transmitted pluses 18. The average counts for the transmitted wavelengths is then used by the data processor to convert the average counts into temperature value based upon an Fe Boltzmann technique for 80 to 100 km altitudes and upon the Rayleigh technique for 30 to 80 km altitudes.

It is known that the temperature in the middle atmosphere is relatively stable over time durations in the order of five minutes or so. The efficiency of laser 10 and of the entire lidar system is improved when using an alternating series of pulses of the two different wavelengths, so that, the laser 10 generates a series of pulses at the first wavelength for a predetermined period of time, and then generates a second series of pulses at the second wavelength for another predetermined period of time. The collected backscattered returns 18 for each respective series are collected, detected and averaged into average photocounts to reduce the effect of background noise and provide average counts for temperature determination.

Figure 2:
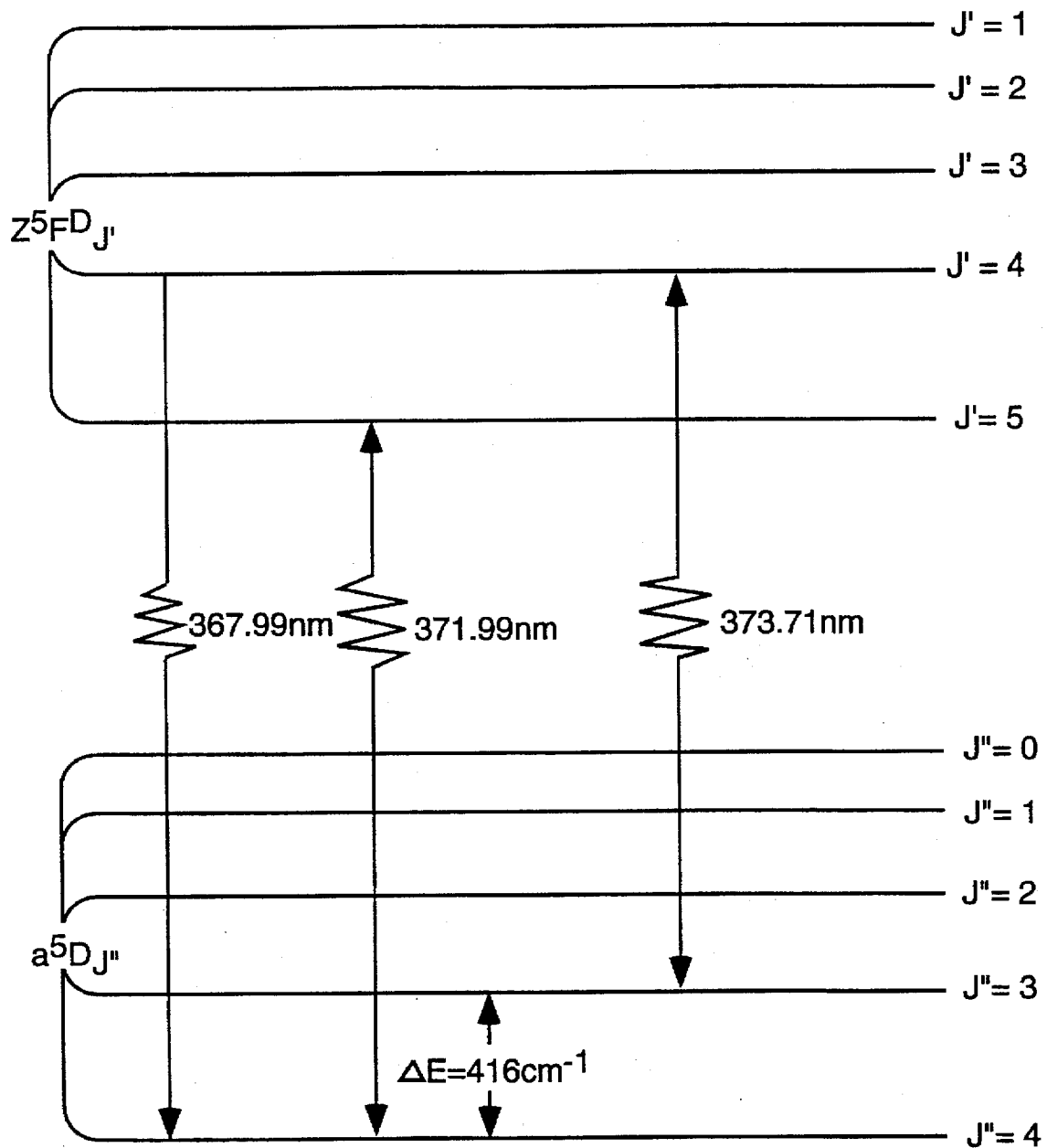
FIG. 2 is a partial Fe energy level diagram.

Referring to FIG. 2, the Fe Boltzmann technique for remotely sensing mesospheric temperatures is based upon the spectroscopy of Fe. FIG. 2 shows a partial energy level diagram of atomic Fe. The $a^5D$ ground level is shown split into five component $J''=0$ through $J''=4$. The separation between the lowest energy levels J"=3 and J"=4 of the ground level quintet is 416 cm$^{-1}$. J"=3 is thermally populated at an energy level above the bottom ground level J"=4. Both J"=3 and J"=4 ground levels are optically coupled to the $z^5F^D$ level centered at 3.375 eV. The $z^5F^D$ level is also shown split into five components J'=1 through J'=5. A $z^5F^D{}_5$ to a $^5D_4$ transition corresponds to 371.99 nm (hereinafter 372 nm) wavelength and is a primary resonance line. A$^5F^D{}_4$ to a$^5D_3$ transition corresponds to 373.71 nm (hereinafter 374 nm) wavelength and is a secondary resonance line. Both transitions possess moderate oscillator strengths of 0.04. There also exists another resonant line of a $z^5F^D{}_4$ to a$^5D_4$ transition which corresponds to a 367.99 nm wavelength (hereinafter 368 nm). Upon illumination excitation, the J'=5 level decays by emission of resonance radiation of 372 nm. The J'=4 level relaxes by fluorescent emission to either the J"=3 providing a resonance providing of 374 nm or to the J"=4 level providing a resonant radiation of 368 nm. For excitation at 374 nm to the J"=4 level, the resulting branching ratio down to the J"=4 level at 368 nm resonance line is nine percent and the branching ratio down to the J"=3 level is 91%. Therefore, the 368 nm resonance line is relatively weak by comparison to the stronger 374 nm resonance line, and therefore, the 368 nm line is not preferably used.

The Fe Boltzmann technique preferably relies upon the relative populations of the J"=4 and J"=3 levels. An illuminating excitation at 374 nm should be use to excite J"=3 populations, and is therefore always preferably used as one of the excitation wavelengths. But, both the 368 nm and 372 nm wavelengths could be used to excite J"=4 populations to an excited energy level. However, the illuminating excitation of the J"=4 population to the J'=4 level using a 368 nm wavelength is not preferably used because of a poor absorption cross section as compared to the illuminating excitation of the J"=4 population to the J'=5 level using the 372 nm wavelength. Because only two fluorescence wavelengths are needed for temperature conversion, the two strongest fluorescence wavelengths at 372 nm and 374 nm wavelengths are used for both illumination excitation and collection. The alternate 368 nm wavelength could also be collected and used for temperature verification of 372 nm and 374 nm temperature sensing.

Fe atoms in the mesosphere can be considered in thermal equilibrium with their surroundings. The steady state population in the ground level J"=3 component is related to the population in the J"=4 level by the Maxwell-Boltzmann equation. The Maxwell-Boltzmann equation is: $n_{(J"=3)}/n_{(J"=4)}=(g_2/g_1)\exp(-\Delta E/kT)$. $n_{(J"=3)}$ is the J"=3 level population. $g_2$ is the degeneracy factor of the J"=3 level. $n_{(J"=4)}$ is the J"=4 level population. $g_2$ is the degeneracy factor of the J"=3 level. $g_1$ is the degeneracy factor for the J"=4 level. $\Delta E$ is the energy separation between the J"=3 and J"=4 levels, that is 416 cm$^{-1}$. k is Boltzmann's constant. T is temperature.

The term $n_{J"=3}/n_{J"=4}$ is the well known Boltzmann factor. From the Maxwell-Boltzmann equation, the population ratio between the J"=3 and J"=4 levels is a function of temperature and is used for temperature determinations. Populations in the remaining J"=2, J"=1 and J"=0 levels are not used as being considered insignificant by comparison to the populations J"=4 and J"=3 levels for temperature determinations.

The Fe Boltzmann lidar system of FIG. 1 employs a new Fe Boltzmann lidar technique for monitoring middle atmospheric temperature. This Fe Boltzmann technique relies upon the transmission of laser pulses at 372 nm and 374 nm and monitoring the corresponding fluorescence returns with the absolute temperature computed from the ratio of the Boltzmann factor, that is, the ratio of relative strength between the primary 372 nm and secondary 374 resonant line returns. The primary 372 nm returns and the secondary 374 nm returns are used to compute temperature, for example, at 200° K., the Boltzmann factor corresponding the cm energy separation between the J"=3 and J"=4 levels is 0.039. That is, when 3.9% of the atomic Fe population resides in the J"=3 level relative to the J"=4 level, the temperature is related to 200° K.

A photocount equation for photoelectronic counts for zenith-viewing fluorescence lidar systems is: $s=(E/hV)(n\sigma L)(A_r/4\pi z^2)T_a{}^2T_0\eta$. s is the photoelectronic counts. E is the transmitter pulse energy. hV is Plank's constant h multiplied by the frequency v, that is, the product being the photon energy. n is the density of the fluorescence species. $\sigma$ is the absorption cross section. L is the sample cell length of spatial resolution. $A_r$ is the receiver area. z is the altitude. $T_a$ is the one way atmospheric transmission. $T_0$ is the transmission through the receiver telescopic optics. $\eta$ is the photomultiplier quantum efficiency.

Contributions to atomic resonant linewidth broadening from collisions are much less than the spectral broadening due to the thermal motion of the radiating atoms because of the reduced molecular density in the metallic layer. For computational purposes, spectral line broadening is based solely upon the Doppler effects of moving Fe atoms. At 200° K., spectral broadening from the Doppler effects for the Fe resonance lines of interest, are set at 1.1 GHz for the full width at half of the magnitude. The Doppler line width is known to vary slightly over temperatures typically experienced in the middle atmosphere. Hence, for computation convenience, the Doppler line width is set as a constant though iterative calculations could be used to improve the computational accuracy of the temperature profile. The affect of Doppler line broadening on a Boltzmann factor temperature technique is not considered critical. Boltzmann factor technique relies upon the ratio of populations and the Doppler line broadening is approximately the same for both Boltzmann populations, thereby substantially eliminating uncertainty associated with Doppler line broadening.

The Doppler broadened absorption cross section is related to the Einstein transition probability by a Doppler broadened equation. The Doppler broadened equation is: $\sigma=(2/\Delta v_D)(\ln 2/\pi)^{1/2}(\lambda^2/8\pi)(g_2/g_1A)$. A is the Einstein transition probability. $\Delta v_D$ is the Doppler line width. $\lambda$ is the wavelength. $g_2$ is the degeneracy factor of the upper J"=3 level. $g_1$ is the degeneracy fact of the lower J"=4 level. Substitution of the Maxwell-Boltzmann equation and the Doppler Broadening equation into the photocount equation yields a relative photocount equation which is: $S_{(374\ nm)}/S_{(372\ nm)}=(\lambda_2\sigma_2g_2/\lambda_1\sigma_1g_1)\exp(-\Delta E/kT)$. Fe spectroscopic parameters for 374 nm and 372 nm transitions are known to be $g_2=7$, $g_1=9$, $A_{J"=4}=0.142\times 10^8$/sec, $A_{(J"=5)}=0.163\times 10^8$sec, $\sigma_{(374\ nm)}=8.78\times 10^{-13}$ cm$^2$, and $\sigma_{(372\ nm)}=9.45\times 10^{-13}$ cm$^2$. The two transitional probabilities $\sigma_1$ and $\sigma_2$ for both wavelengths using the Doppler broadening equation can be computed using the Doppler bandwidth of 1.1 GHz for an assumed 200° K. constant temperature. Inserting those transition probabilities, and the spectroscopic parameters for the 372 nm and 374 nm Fe transitions into respective photocount equations, yields a relative photocount equation which relates the relative photocount between the two wavelength and temperature. The relative photocount equation, in accordance with the present invention is: $[S_{(374\ nm)}/S_{(372\ nm)}]=0.73\exp^{(-\Delta E/kT)}$.

It should now be apparent that the ratio of two wavelength return signals at the same altitude depends upon $\Delta E$, k and the ratio of the wavelengths, degeneracies and transition probabilities parameters. The absolute accuracy of temperature measurement by the Fe Boltzmann technique of the lidar system of FIG. 1 depends upon the accuracy of these values. With the exception of the transition probabilities, all of these parameters are known within 0.1%. The uncertainties associated with the transition probabilities of the J"=5 and J"=4 levels are approximately 10%, but the relative accuracy of the two transition probabilities is known to be less than 0.5%. The Fe Boltzmann technique lidar system of the present invention is believed to have accuracy within 1%.

Figure 3:
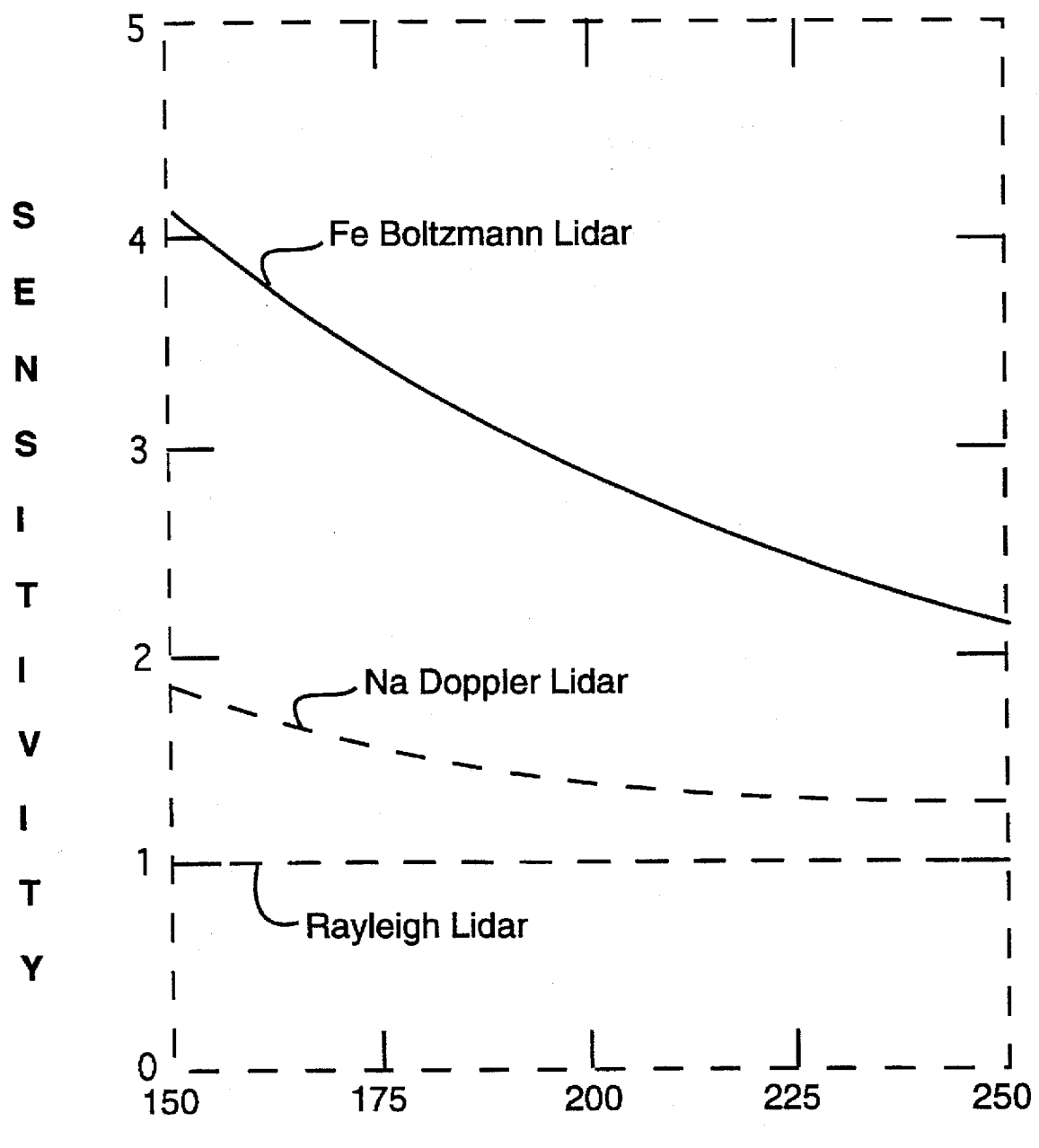
FIG. 3 is a sensitivity-temperature plot for the Boltzmann technique, the prior art Na Doppler lidar technique, and the prior art Rayleigh technique.

Temperature sensitivity $S_T$ is defined as the absolute value of the ratio of fractional change of the lidar returns to the fractional temperature change. The sensitivity equation is $S_T=|\Delta S/S|/|\Delta T/T|$. The temperature sensitivity $S_T$ can be calculated for the Fe lidar system of FIG. 1 and plotted as shown in FIG. 3. The calculation is simplified by setting the population in the lowest J"=4 level to a constant value. Using a constant value for the J"=4 population, the mathematical derivative of the Maxwell-Boltzmann equations of the J"=3 population with respect to temperature yields a $dn_{(J"=3)}/n_{(J"=3)}=(\Delta E/kT)(dT/T)$ Maxwell-Boltzmann derivative equation. From the photocount equation, the lidar return signal is directly proportional to the population n. Thus, temperature sensitivity is $(\Delta E/kT)$. At a mesospheric Fe temperature of 200° K., the temperature sensitivity equals 3.0. A 1% temperature variation at 200° K. will change the upper sublevel population and the signal ratio by 3%. Referring to FIG. 3, the theoretical temperature sensitivity of the Fe Boltzmann technique lidar system is plotted as a function of expected temperature in the 80 to 100 km altitude region. The $S_T$ of the Fe Boltzmann technique lidar system decreases monotonically from a maximum of 4.1 at 150° K. to 2.2 at 250° K. Also plotted for comparison purposes are the temperature sensitivity for the middle atmospheric dual wavelength Na Doppler temperature lidar and the Rayleigh lidar.

Temperature sensitivity is an important factor in determining return signal count $S(\Delta)$ to achieve temperature precision. Assumed ideal Poissonian statistics associated with the conversion of received photon returns into electronic pulse counts by the photo multiplier tube, the signal counts are related to the temperature sensitivity by a sensitivity photocount equation $S(\Delta)=(\Delta \times S_T)^{-2}$. Implicit in this equation is the absence of background noise and photo multiplier tube dark current noise. For lidar techniques with high $S_T$ sensitivity, less integration time is required to achieve a specific temperature uncertainty.

Lidar photocount returns can be calculated for a moderate power dual wavelength lidar system operating at the Fe resonance wavelengths monitoring Fe fluorescence return signals originating in the mesosphere using the photocount equation. An average density value of $2 \times 10^4$ atoms/cm$^3$ may be assumed. For a 370 nm lidar system, system parameters may typically be E=250 mJ/pulse, $A_r$=1 m$_2$, L=3 km, $T_a^2$=0.2, $T_O$=0.4, and $\eta$=0.3. The transmitted pulses are assumed to be single frequency with line widths much less that the 1.1 GHz Doppler widths of the Fe transitions. Substitution of these values into the photocount equation, $S_{(374\ nm)}$ equals 24 counts and $S_{(372\ nm)}$ equals 670 counts. The integration time for photocount collection required to achieve temperature measurements with 1% precision can be calculated. Substitution of the appropriate values for the Fe Boltzmann technique lidar system into the sensitivity photocount equation, $1.1 \times 10^3$ counts for the 374 nm wavelength are necessary, which corresponds to forty six pulse pairs. At an assumed count rate of ten hertz rate, the requisite counts will be accumulated in nine seconds.

The hereinabove described performance is based upon a 250 mJ laser system tunable between 372 nm and 374 nm. The amount of energy required is about an order of magnitude greater than the energy required to map the density of the Fe layer of the mesosphere using the single frequency dye lasers. Additionally, the system must be capable of producing single frequency transmitted pulses with good pulse-to-pulse frequency stability in order to overlap the 1.1 GHz wide Doppler broadened Fe resonance lines. Dye laser output energies may be scaled to produce higher energies in the 250 mJ range, but may then exhibit poor frequency stability because of thermal and photochemical problems associated with the operation of dye lasers. Tunable solid state lasers can achieve the required performance. Such solid state lasers are the frequency doubled alexandrite and titanium-sapphire lasers. Diode lasers with injection-locking of the oscillators have exhibited highly stable outputs. Optical parametric oscillators may also be suitable as well.

The temperature measurement technique of the present invention may be implemented in a variety of ways. One way places a 368 to 374 nm pass band optical filter in front of the photodetector. This filter excludes sky light and eliminates the need to change filters when transmitter wavelength is switched between different transmitter pulses corresponding to the Fe resonance lines. Accurate temperature measurements require the accumulation of returns at each wavelength for an appropriate integration time period over which the Fe density is stationary. This time is preferably less than five minutes beyond which Fe density may begin to vary significantly. The dynamics of the well known Na layer is similar to that of the Fe layer, and is stationary for several minutes. The transmitter wavelengths are switched between respective alternating integration time periods having preferably the same integration time for example, three minutes. Alternatively, a preferred asymmetric transmission sequence can improve system precision by increased collection of the weaker signal returns relative to the stronger returns. Transmission of the 374 pulses having weaker returns preferably have a greater percentage of the transmission duty cycle. A 90% transmission duty cycle of the 374 pulses having weaker returns from the thermally populated resonance line is suitable with a corresponding 10% transmission duty cycle for the 372 pulses having much stronger returns.

The Fe Boltzmann technique lidar system of the present invention for monitoring the 80 to 100 km mesosphere temperature is enhanced by the simultaneous usage of the same system as a Rayleigh lidar measuring temperature at the lower 30 to 80 km altitudes. The transmission pulses simultaneously provide both Fe Boltzmann returns for the mesosphere and Rayleigh returns for the remaining portion of the middle atmosphere. This dual temperature lidar technique is enabled by virtue of the Fe Boltzmann wavelengths between 368 to 374 nm lying within the preferred 360 to 410 nm wavelength band suitable for the Rayleigh lidar technique. Advantage of using 368 to 374 nm transmission pulses is an operation using Nearby UV wavelengths which are eye safe with reduced sky background noise.

Figure 4:
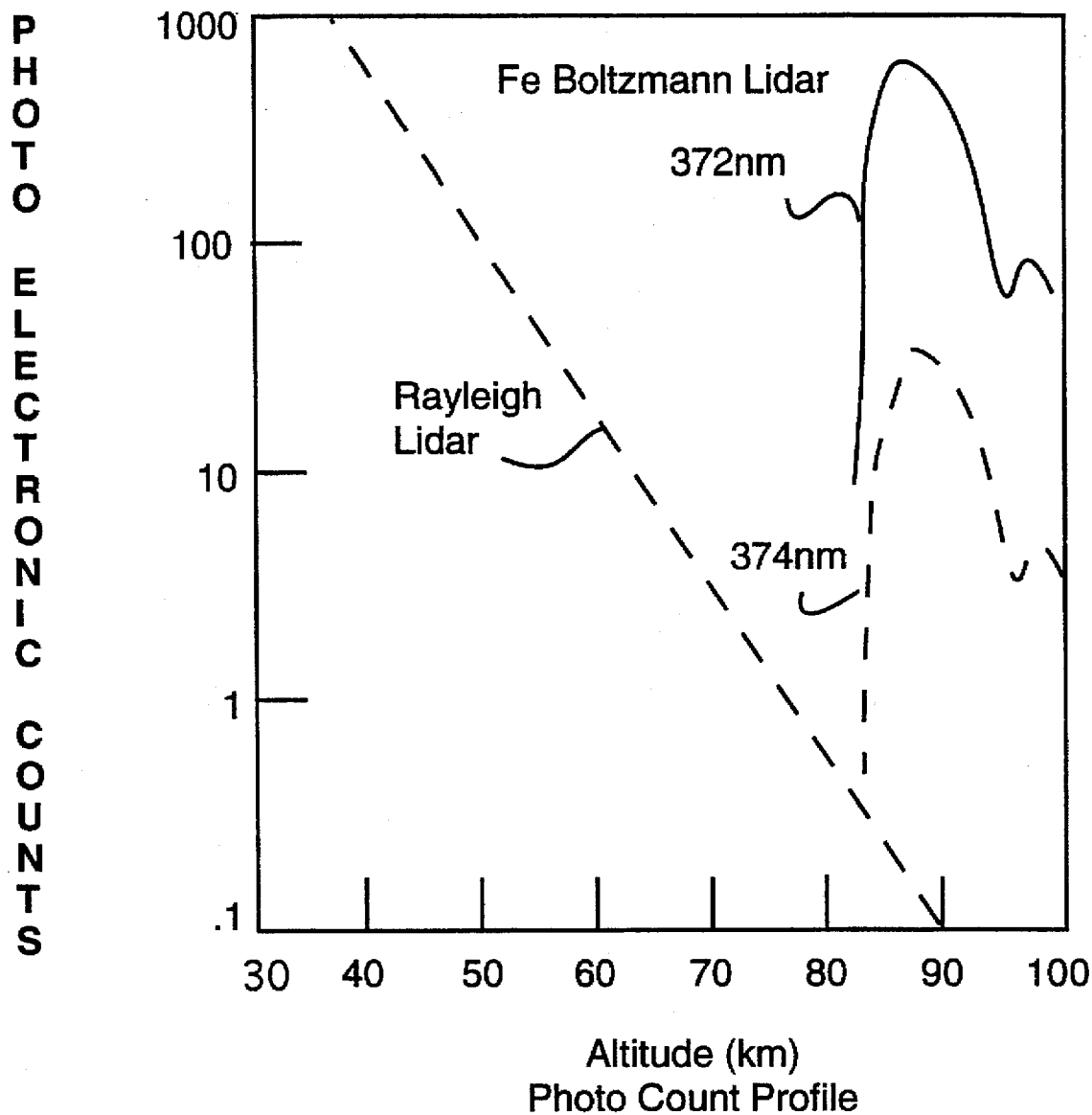
FIG. 4 is a photocount profile graph resulting from the combined Fe Boltzmann and Rayleigh technique.

Simulated performance of the dual wavelength Fe lidar system is shown in FIG. 4 having photocount returns for both the combined Rayleigh and Fe Boltzmann lidar of the dual technique system. Plotted are the single shot Fe fluorescence returns excited at 372 nm and 374 nm wavelengths and the Rayleigh returns for the entire 30 to 100 km altitude region. The dual system parameters for the simulating performance include the Fe spectroscopy parameters stated herein. Model atmospheric densities and temperatures were used in the Rayleigh simulation and to compute the Fe fluorescence returns at the thermally populated resonance line. The Rayleigh backscattering photocount cross section was calculated from previously measured values at 337.1 nm and scaled to 372 nm by a $\lambda^{-4}$ factor. The maximum Fe density was 2.1 $10^4/cm^3$ near 90 km with a $2\times10^4/cm^3$ density for 372 nm returns and $7.8\times10^2/cm^3$ for 374 nm returns providing $9.5\times10^{-13}$ cm and $8.8\times10^{-13}$ cm$^2$ cross section, respectively, at 200° K. The efficiency of the new system is one. Counts at the weaker 374 nm line for one percent temperature precision is $1.1\times10^3$. The simulated Rayleigh returns from the lower mesosphere are comparable in magnitude to the Fe returns, a result which is independent of system parameters. Rayleigh and Fe fluorescence returns can be obtained at the same altitude, e.g. 80 km. Temperature measurement inferred from the Fe fluorescence returns can serve as a high end point absolute calibration for the Rayleigh lidar measurements.

Transmitter power required to monitor temperature with equal precision of the dual wavelength Na Doppler lidar and the Fe Boltzmann lidar can be compared. Analysis is simplified by ignoring uncertainties associated with the stronger wavelengths which are much smaller than weaker wavelengths of weaker wavelengths. The Fe Boltzmann technique requires an order of magnitude of greater power than the Na Doppler lidar to obtain similar signal levels at their respective weaker lines. To obtain identical measurement precision for the Fe Boltzmann lidar and Na Doppler lidar methods, the respective weak signal levels need to be modified to account for differences in temperature sensitivity. When modified, the Fe Boltzmann lidar requires 2.6 times the power of the Na Doppler lidar system.

The present invention covers a Fe Boltzmann lidar for measuring the mesosphere operating at Fe fluorescence resonance line wavelengths, and also covers a Rayleigh lidar also operating at the same wavelength. But, those skilled in the art may find alternative middle atmosphere materials suitable for Boltzmann lidar temperature sensing. For an Fe Boltzmann lidar, the excitation illuminations are preferably at 372 nm and 374 nm. The collection returns are preferably also at these wavelengths, though other emission resonance lines may be used, for example, the Fe resonance line at 368 nm. The system may be further enhanced and modified to operate under different dimensions, power and efficiencies using differing lasers, optical transmitters, optical receivers, optical filters, photodetectors and data processors. However, those enhancements, improvements and modifications may nonetheless fall within the spirit and scope of the following claims.

What is claimed is:

1. A system for measuring temperatures at respective altitudes of a middle atmosphere, said system comprising, a laser for generating two pulses at two respective wavelengths exciting material in said middle atmosphere respectively backscattering two returns, an optical transmitter for transmitting said two pulses into said middle atmosphere, an optical receiver for collecting said two returns being backscattered from said middle atmosphere, an optical filter for passing said two returns and filtering background noise, a photodetector for converting said two returns into electronic counts, and a data processor implementing a Boltzmann technique for relating said electronic counts to said temperatures, said two returns respectively comprising two fluorescence resonance line returns of said material, and said Boltzmann technique relates ratios of said two fluorescence resonance line returns to said temperatures.

2. The system of claim 1 wherein said two wavelengths and said two fluorescence resonance line returns are respectively at 371.99 nm and 373.71 nm, said material comprises atomic iron, and said middle atmosphere is between 80 and 100 km.

3. The system of claim 1 wherein said two pulses at said two wavelengths are two respective series of pulses having unequal respective duty cycles.

4. The system of claim 1 wherein said laser is a solid state laser generating said two pulses during two respective times periods, said optical filter has a band pass for passing said two wavelengths and discriminating against background radiation, said optical receiver is a telescope, and said photodetector is a photomultiplier tube.

5. The system of claim 1 wherein said optical filter is a dielectric filter pass band filter centered at 373 nm with a 2 nm band pass width, said two wavelengths and said two fluorescence resonance line returns are respectively at 371.99 nm and 373.71 nm, said material comprises atomic iron, and said middle atmosphere is between 80 and 100 km.

6. The system of claim 1 wherein said laser is a frequency doubled alexandrite laser, said two wavelengths and said fluorescence resonance line returns are respectively at 371.99 nm and 373.71 nm, said material comprises atomic iron, said optical filter is a dielectric pass band filter centered at 373 nm with a 2 nm band pass width, said optical receiver is a one square meter telescope, said photodetector is a one inch diameter bi-alkali photocathode photomultiplier tube, and said middle atmosphere is between 80 km and 100 km.

7. The system of claim 1 wherein said system further comprises a splitter for splitting said two pulses generated by said laser for communicating in part said two pulses to said data processor for power normalization of said two fluorescence resonance line returns relative to said StwoS pulses and for providing a transmitter time reference for referencing said two fluorescence resonance line returns to said respective altitudes.

8. The system of claim 1 wherein said laser is a frequency doubled titanium sapphire laser.

9. A system for measuring temperatures at respective altitudes of a middle atmosphere, said system comprising, a laser for generating two pulses respectively at two wavelengths exciting material in said middle atmosphere, said middle atmosphere respectively backscattering two returns, said material comprises atomic iron, said two returns respectively comprise two elastic returns and respectively comprise two fluorescence resonance line returns, an optical transmitter for transmitting said two pulses into said middle atmosphere, said two wavelengths and said two returns are at 371.99 nm and 373.71 nm, an optical receiver for collecting said two returns being backscattered from said middle atmosphere, an optical filter for passing said two returns and filtering background noise, a photodetector for converting said two returns into electronic counts, and a data processor for implementing a Boltzmann technique and a Rayleigh technique for relating said electronic counts to said temperatures, said Boltzmann technique for measuring temperatures of said atomic iron in a higher portion of said middle atmosphere by relating said temperatures to ratios of said two fluorescence resonance line returns, and said Rayleigh technique for measuring said temperatures in a lower portion of said middle atmosphere by relating at least one of said two elastic returns to said temperatures.

10. The system of claim 9 wherein said higher portion is between 80 km and 100 km and said lower portion is between 30 km and 80 km, said data processor further for providing a temperature profile over said respective altitudes through said middle atmosphere.

11. The system of claim 9 wherein said data processor is further for calibrating said Rayleigh technique by a temperature computed by said Boltzmann technique at a respective altitude separating said lower portion and said higher portion.

12. A method for measuring temperatures at respective altitudes of a middle atmosphere, said method comprising the steps of, generating first pulses at a first wavelength, transmitting said first pulses for a predetermined amount of first transmission time period into said middle atmosphere, said middle atmosphere backscattering said first pulses into first returns comprising first fluorescence resonance line returns, collecting said first returns for said first wavelength for a predetermined amount of first collection time period, filtering said first returns for passing said first returns and filtering background noise, converting said first returns into first electronic counts, storing said first electronic counts, generating second pulses at a second wavelength, transmitting said second pulses for a predetermined amount of second transmission time period into said middle atmosphere, said middle atmosphere backscattering said second pulses into second returns comprising second fluorescence resonance line returns, collecting said second returns for said second wavelength for a predetermined amount of second collection time period, filtering said second returns for passing said second returns and filtering background noise, converting said second returns into second electronic counts, storing said second electronic counts, and computing said temperatures of said middle atmosphere using a Boltzmann technique based on said first and second fluorescence resonance line returns by relating ratios of said first and second electronic counts to said temperatures.

13. The method of claim 12 wherein said middle atmosphere contains atomic iron between 80 km and 100 km, said first wavelength is 371.99 nm, said first returns are at 371.99 nm, said second wavelength is 373.71 nm, and said second fluorescence resonance line returns are at 373.71 nm.

14. The method of claim 12 wherein said first transmission time period and said second transmission time period are unequal.

15. The method of claim 12 wherein said first collection time period and said second collection time periods are unequal.

16. A method for measuring temperatures at respective altitudes of a middle atmosphere having an upper altitude, a middle altitude and a bottom altitude, said method comprising the steps of, generating first pulses at a first wavelength, transmitting said first pulses for a predetermined amount of first transmission time period into said middle atmosphere, said middle atmosphere backscattering said first pulses into first returns comprising first fluorescence resonance line returns and first elastic returns, collecting said first returns for said first wavelength for a predetermined amount of first collection time period, filtering said first returns for passing said first returns and filtering background noise, converting said first returns into first electronic counts, storing said first electronic counts, generating second pulses at a second wavelength, transmitting said second pulses for a predetermined amount of second transmission time period into said middle atmosphere, said middle atmosphere backscattering said second pulses into second returns comprising second fluorescence resonance line returns and second elastic returns, collecting said second returns for said second wavelength for a predetermined amount of second collection time period, filtering said second returns for passing said second returns and filtering background noise, converting said second returns into second electronic counts, storing said second electronic counts, and computing temperatures of said middle atmosphere between said upper altitude and said middle altitude using a Boltzmann technique based on said first and second fluorescence resonance line returns by relating said first and second electronic counts to said temperatures between said upper altitude and said middle altitude of said middle atmosphere, and computing temperatures of said middle atmosphere between said middle altitude and said bottom altitude using a Rayleigh technique based on said first and second elastic returns by relating one of said first and second electronic counts to said temperatures between said middle altitude and said bottom altitude of said middle atmosphere.

17. The method of claim 16 wherein said method further comprises the steps of splitting said first and second pulses respectively into a first portion and a second portion, said first portion being transmitted, normalizing power of amounts of said first and second returns to said second portion, and referencing by time for altitude ranging said first and second returns to said second portion to reference said respective altitudes to said first and second electronic counts.

18. The method of claim 16 wherein said method further comprises the step of calibrating said Rayleigh technique with a temperature at said middle altitude as computed using said Boltzmann technique.

19. The method of claim 16 wherein said first pulses are a series of first pulses at said first wavelength said second pulses are a series of second pulses at said second wavelength, said first electronic counts are a series of first electronic counts, said second electronic counts are a series of second electronic counts, said first returns are a series of first returns, said second returns are a series of second returns, said Boltzmann technique is for relating ratios of an average of said first and second series of electronic counts of said first and second fluorescence resonance line returns to said temperatures, said Rayleigh technique is for relating an average of one of said first or second electronic counts of said first or second elastic returns to said temperatures, said method further comprising the steps of, averaging said first electronic counts, and averaging said second electronic counts.

20. The method of claim 16 wherein both of said storing steps, said first and second electronic counts are stored by time segments respectively time referenced to the beginning of each of said first and second pulses, said method further comprising the steps of, accumulating said first electronic counts by said time segments referenced to said respective altitudes of said middle atmosphere, and accumulating said second electronic counts by said time segments referenced to said respective altitudes of said middle atmosphere.

\* \* \* \* \*